United States Patent [19]

Grasso

[11] 4,306,606
[45] Dec. 22, 1981

[54] TIRE STRIPPER

[76] Inventor: Joseph F. Grasso, 119 Ridge St., Rome, N.Y. 13440

[21] Appl. No.: 153,402

[22] Filed: May 27, 1980

[51] Int. Cl.³ .............................................. B60C 25/00
[52] U.S. Cl. .................................... 157/1.1; 157/1.26
[58] Field of Search ...................... 157/1.1, 1.21, 1.17, 157/1.24, 1.28, 1.33

[56] References Cited

U.S. PATENT DOCUMENTS

| | | | |
|---|---|---|---|
| 2,873,795 | 2/1959 | Kleparchuk | 157/1.17 |
| 2,898,977 | 8/1959 | Denn | 157/1.17 X |
| 3,612,140 | 10/1971 | Maliniski | 157/1.17 |
| 3,742,999 | 7/1973 | Myers, Jr. | 157/1.28 |
| 3,857,430 | 12/1974 | Harnois et al. | 157/1.33 |
| 4,083,394 | 4/1978 | Heikkinen et al. | 157/1.21 |
| 4,163,468 | 8/1979 | Mueller | 157/1.17 |

Primary Examiner—James G. Smith
Attorney, Agent, or Firm—Bruns & Jenney

[57] ABSTRACT

A device for separating a pneumatic casing from the rim of a wheel to enable both the rim and the wheel to be reclaimed as separate units. The wheel is placed upon a horizontal worktable and a clamping arm is brought down upon the rim to secure it to the table. A stripping tool having spike-like fingers is brought upwardly into engagement with the casing. As the tool moves up past the rim, the wheel beads are broken by the tool and the casing is lifted free of the rim. Both the clamping arm and the stripping tool are adapted to clear the worktable during loading and unloading of the wheels whereby the wheels can be moved easily into and out of the work zone.

15 Claims, 3 Drawing Figures

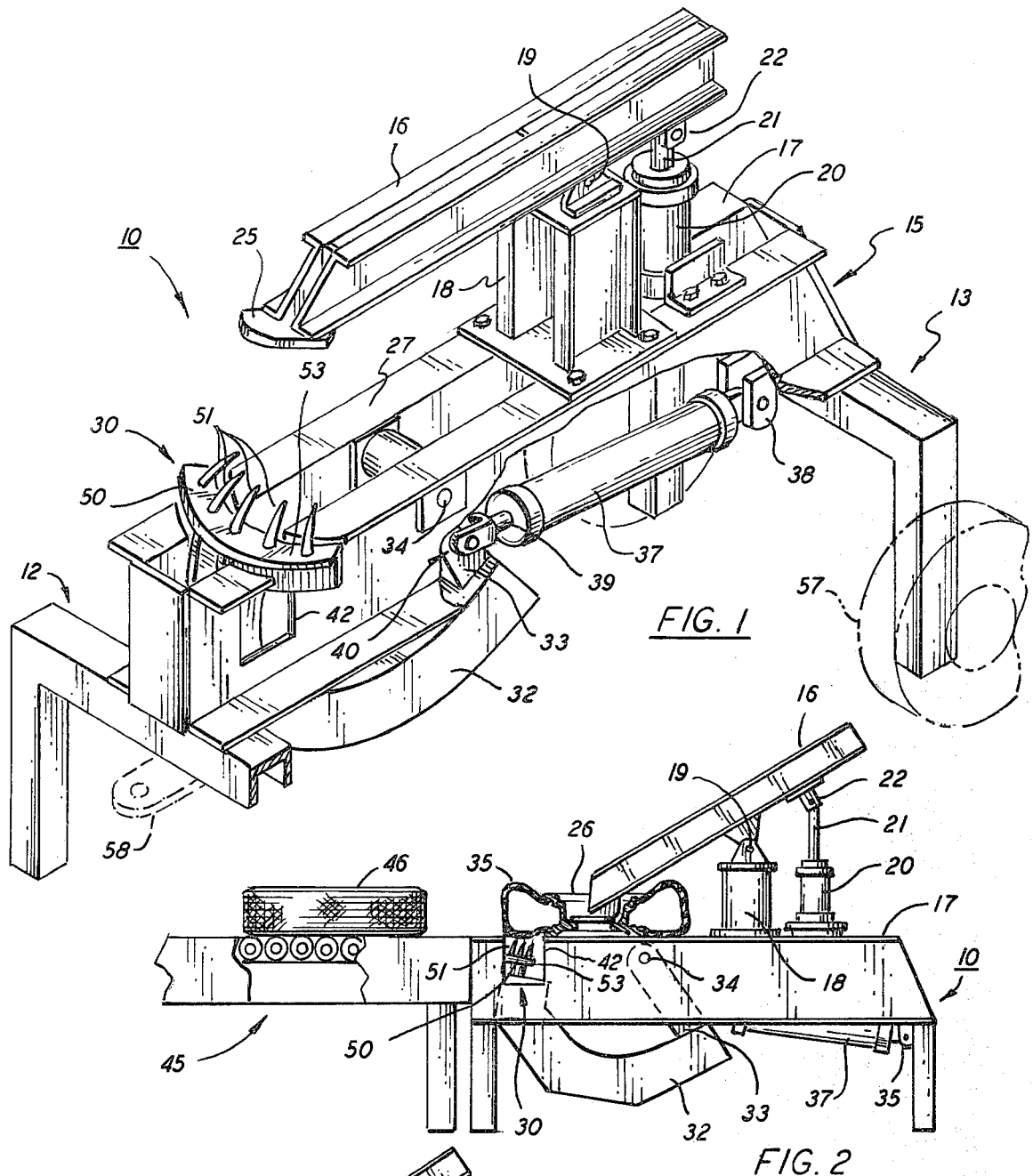
FIG. 1
FIG. 2
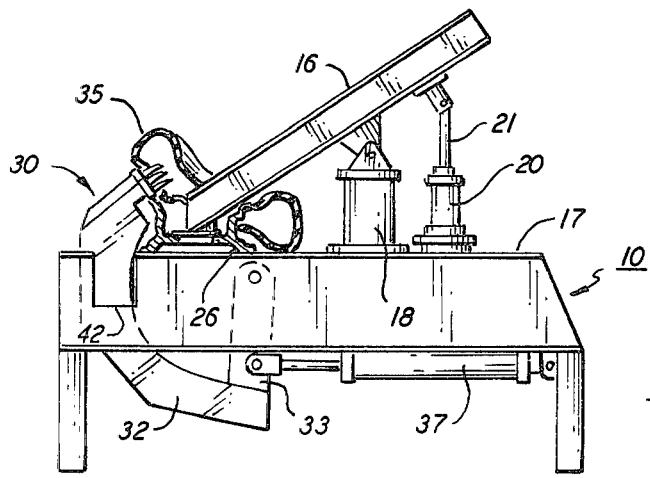
FIG. 3

TIRE STRIPPER

BACKGROUND OF THE INVENTION

This invention relates generally to the salvage industry and, in particular, to means for automatically stripping the outer casing from the rim of a wheel so that the casing and the rim can be salvaged separately.

During the scrapping of motor vehicles, it is the common practice to remove the wheels from the vehicle and attempt to salvage both the casings and the rims as separate units. Previously, when a number of wheels had been collected, they were set afire in order to burn the casings away from the rims and only the rims were recovered. This process proved to be extremely wasteful in that the casing could not be reclaimed and the burning created a serious air pollution problem. Accordingly, it has been for the most part abandoned.

Attempts have been made to separate the casings from the wheel rims with conventional tire removal tools of the type used in auto repair centers or the like. Tire changing devices of this nature are disclosed in U.S. Pat. Nos. 2,898,977 and 2,873,795. In order to prevent the wheel parts from being harmed, the tire changing equipment generally must be accurately fitted upon the rim by hand and the separating tool guided into contact with the casing. Typically, the equipment is complex and difficult to both mount on the wheel and operate. Consequently, a good deal of time is normally required to remove a single casing from a rim and therefore the use of this equipment in a high volume salvage operation is relatively unprofitable.

A tire stripping machine specifically designed for use in the salvage industry is described in U.S. Pat. No. 4,083,394. The wheel to be stripped is centered upon a worktable between three equally-spaced rams that are adapted to drive wedges horizontally into the tire. Sufficient force is applied to the wheel to collapse the casing and crush the rim. Upon retraction of the wedges, the casing springs back to its original shape and is simply slipped over the deformed rim. Although this machine works quite well in producing separation, the wheels must be loaded and unloaded by hand over the top of the rams. The final removal of the casing from the rim must also be achieved manually. This, of course, takes considerable time and leads to operator fatigue. By the same token, operating three rams with sufficient force to crush a steel rim consumes a relatively high amount of energy which makes the process costly.

SUMMARY OF THE INVENTION

It is therefore an object of the present invention to improve apparatus used in the salvage industry for stripping casings from wheel rims.

A further object of the present invention is to provide a wheel stripping machine that can be loaded and unloaded with a minimum amount of manual labor.

A still further object of the present invention is to provide a machine that is capable of stripping casings from wheel rims at a relatively high rate.

Another object of the present invention is to minimize the amount of energy required to strip a casing from the rim of a wheel.

Yet another object of the present invention is to reduce the amount of operator fatigue experienced when operating a tire stripping machine.

These and other objects of the present invention are attained by means of apparatus for separating a casing from the rim of a wheel that includes a frame having a horizontal worktable for supporting a wheel in a flat position thereon, a power-actuated holddown bar that is adapted to swing down against the rim of a wheel situated upon the table and clamp the rim to the table, a power-actuated tool having spike-like fingers that is arranged to swing upwardly into engagement with the casing of the wheel and to break the beads as the casing is carried over the top of the rim. Both the clamping arm and the stripping tool are able to be moved away from the table to clear the work area to allow easy loading and/or unloading of the table.

BRIEF DESCRIPTION OF THE DRAWINGS

For a better understanding of these and other objects of the present invention, reference is had to the following detailed description of the invention which is to be read in conjunction with the accompanying drawings, wherein:

FIG. 1 is a perspective view of a stripping apparatus embodying the teachings of the present invention;

FIG. 2 is a side elevation view, reduced in size, showing the stripping apparatus of FIG. 1 operating in association with a conveyor means for bringing wheels onto or off of the worktable of the apparatus; and FIG. 3 is also a side elevation of the stripping apparatus of FIG. 1 showing a casing being lifted over the rim of a wheel mounted therein.

DESCRIPTION OF THE INVENTION

Referring now to the drawings, and in particular to FIG. 1, there is shown a wheel stripping machine generally reference 10 that embodies the teachings of the present invention. The machine is mounted upon an extremely rigid base frame 11 that includes a pair of U-shaped support brackets 12 and 13 that are cojoined in spaced-apart relationship by means of a horizontal cross member 15. The brackets and the cross member are fabricated from structural shapes that are welded together in assembly to provide a high strength stable platform upon which the stripping operation is carried out.

A hydraulically-actuated lever bar 16 is mounted upon the top surface 17 of the cross member at the rear thereof. The bar is supported at an elevated position upon a stanchion 18 by means of a pivot pin 19 so that the bar can swing about the horizontal center line of the pin. A vertically aligned hydraulic drive cylinder 20 is bolted or otherwise secured behind the stanchion upon the cross member. The actuating arm 21 of the cylinder is connected to the back of the lever bar by means of a clevis 22.

By extending or retracting the cylinder arm 21, the front of the lever bar can be raised or lowered in regard to the cross member of the frame. A contoured clamping pad 25 is carried on the lower front section of the lever bar and is arranged so that it can be brought down into clamping engagement against the bolting flange of a wheel rim 26 situated upon the worktable 27 of the machine. The worktable of the machine is defined roughly by that part of the top surface of the cross member extending laterally from the stripping tool 30 to the base of the stanchion 18 and represents the zone in which a tire to be stripped is seated during the stripping operation. In assembly, the clamping pad is obliquely situated in regard to the bar so that it will rest flat against the bolting flange of the rim when the bar is brought to a clamping position as shown in FIG. 2. The action stroke of cylinder 20 is sufficiently long to enable the pad 25 to be raised well above the worktable when the bar is moved to a release position. This, in turn, provides the machine with ample clearance to facilitate loading and unloading of the wheel from the table.

The stripping tool 30 is mounted in the forward end of the frame at the front of the worktable. The tool is secured to an arcuate-shaped segment 32 that is welded to a link 33. The link, as best seen in FIGS. 2 and 3, is pivotably supported beneath the frame in the cross member by means of a heavy trunnion 34 whereby the tool can swing upwardly from beneath the table into engagement with the casing 35 of the wheel mounted on the table.

The tool is controlled by means of a second hydraulic drive cylinder 37 pinned in the rear of the frame upon support member 38. The actuating arm 39 of the cylinder is attached to the link 33 via a clevis assembly 40. As illustrated in FIG. 2, the entire tool is capable of being retracted beneath the worktable into a cutout 42 formed in the cross member. Here again, retraction of the tool beneath the table clears the work area for easy loading and unloading of the machine. A roll conveyor 45 of any suitable design is shown positioned adjacent to the stripping machine with the conveying path thereof being at the same elevation as the top surface 17 of the machine. Tires, such as tire 46, can be simply moved from the conveyor onto the worktable, or vice versa, with a minimum amount of effort on the part of the operator. A pair of similar conveyors can be employed to carry out the loading and unloading functions.

Tool 30 has a laterally extended body 50 that is generally arcuate in form with the center of the arc generally being situated at the center of the worktable. A plurality of upraised, spike-like fingers 51 are securely mounted in the tool. The fingers are also arcuate in form with the spike-like body extending upwardly and inwardly toward the worktable. The inner section of the tool provides a bead-breaking anvil 53 that is capable of engaging the relatively strong tire beads formed between the casing and the rim to force the casing away from the rim during the stripping operation.

In operation, a wheel to be stripped is laid upon the worktable in a horizontal position with the casing located over the stripping tool and the rim beneath the lever bar. The operator then actuates drive cylinder 20 causing the bar to bring the clamping pad down into clamping engagement against the center bolting flange of the rim as shown in FIG. 2. With the rim securely clamped to the table, the second drive cylinder 37 is activated causing the tool 30 to be driven upwardly toward the wheel casing. The spike-like fingers are initially passed into the casing to provide the tool with a firm grip upon the casing. As the tool continues to move in an upward direction, the bead-breaking anvil 53 of the tool is carried first into the lower bead region of the tire and then up into the upper bead region whereupon the two beads are quickly and automatically broken. Finally, as shown in FIG. 3, the casing is swept over the top of the rim to effect the final separation.

Once separation has been achieved, the lever bar is raised and the rim taken from the table. The casing is then removed from the fingers of the tool and segregated from the rim. In the event the casing proves difficult to remove, the tool can be retracted into the table thereby withdrawing the fingers from the casing body. Upon the tool clearing the table, a new wheel is forwarded thereon and the process repeated.

The frame of the present machine can be made mobile by mounting a pair of tires 57—57 upon the rear bracket 13 as shown in FIG. 1. A towing hitch 58 can also be welded or otherwise secured to the front bracket 12 whereupon the unit can be mounted upon a motor vehicle. Although not shown, hydraulic lines are operatively connected to both drive cylinders to supply fluid to the cylinders from a pump. In the case of a mobile unit the pump will be driven directly from the vehicle engine.

While this invention has been described with reference to the details as set forth above, it is not limited to the specific structure as disclosed and the invention is intended to cover any modifications or changes as may come within the scope of the following claims.

I claim:

1. Apparatus for separating a casing from the rim of a wheel so that both the casing and rim may be recovered separately for recycling, the apparatus including
   a frame having a worktable for supporting a wheel in a horizontal position thereon,
   a power-actuated holddown means mounted in the frame adjacent to the worktable having a lever bar that extends over the table and which is actionable to move downwardly into clamping contact against the rim of a wheel supported on the table to secure the rim to the table,
   a power-actuated stripping means movably mounted in the frame directly below the worktable that includes a tool mounted upon an arm that is pivotably supported in the frame to move the tool upwardly from beneath the worktable to a position above the top surface of a rim clamped to the table.

2. The apparatus of claim 1 wherein said lever bar further includes a clamping pad secured to the rim engaging end thereof that is contoured to engage the bolting flange of a wheel situated upon the table.

3. The apparatus of claim 1 wherein said tool contains a plurality of spike-like fingers that are raised upwardly and inwardly toward the center of the worktable for penetrating the casing as the tool is raised by the arm.

4. The apparatus of claim 3 wherein said tool further contains an arcuate-shaped anvil that compliments the inside diameter of a wheel casing and which is arranged to break the beads formed between the casing and the rim of the wheel as the tool arm moves upwardly.

5. The apparatus of claim 1 that further includes first and second drive cylinders for actuating the lever bar and tool arm.

6. Apparatus for removing an outer casing from the rim of a wheel that includes in combination
   a horizontal worktable securely mounted within a rigid support frame for supporting a wheel thereupon in a horizontal posture,
   a clamping means mounted in the frame adjacent to the worktable containing a lever bar extending over the worktable that is actionable to move into engagement against the rim of a wheel situated upon the worktable to securely clamp the rim to the table,
   a first drive means for moving the lever bar into and out of engagement with a rim,
   a stripping tool movably supported below the worktable upon an arm that is mounted on a pivot to move upwardly into engagement with the casing of a wheel situated upon the worktable, said stripping tool further including a plurality of spike-like fingers arranged to penetrate into the casing and an arcuate-shaped anvil that is arranged to engage the beads formed between the casing and the rim, a second drive means for raising the tool arm above the top surface of a rim situated upon the worktable whereby the fingers penetrate into the casing and the anvil forces the beads of the casing over the rim and then lowers the tool below the level of the work surface.

7. The apparatus of claim 6 that further includes a conveyor means for moving the wheels laterally onto the worktable.

8. The apparatus of claim 6 wherein the spike-like fingers are aligned along a chord of an arc having its center at the center of the worktable and said fingers extend upwardly and inwardly in regard to the center of the table.

9. The apparatus of claim 6 wherein the lever bar contains a contoured plate at the rim-engaging end thereof that generally compliments the bolting flange of the rim to provide a positive clamping action thereagainst.

10. The apparatus of claim 6 further including wheel means secured to the frame whereby the frame can be easily transported.

11. A method of removing an outer casing from an inner rim of a wheel including the steps of
positioning a wheel having an outer casing and an inner rim upon a worktable,
bringing a lever arm down against the rim with sufficient force to securely clamp the rim to the worktable,
puncturing the bottom section of the casing with a plurality of spike-like fingers mounted upon a stripping tool, and
raising the stripping tool above the top surface of the rim whereby the casing is separated from the rim.

12. The method of claim 11 further including the steps of raising the lever arm to release the rim from the worktable and removing the separated casing and rim from the worktable.

13. The method of claim 12 that further includes the step of retracting the stripping tool below the top surface of the worktable to enable wheels to be loaded laterally onto and off of the worktable.

14. The method of claim 11 further including the step of forcing a section of the tool against both the upper and lower beads of the casing as the tool is being raised to break the beads away from the rim.

15. The method of claim 11 further including the step of laterally conveying a wheel onto the worktable after the tool has been retracted below the table.

* * * * *